(12) United States Patent
Von Hofen et al.

(10) Patent No.: US 11,296,364 B2
(45) Date of Patent: Apr. 5, 2022

(54) RECHARGEABLE BATTERY PACK AND GARDENING AND/OR FORESTRY WORK SYSTEM

(71) Applicant: Andreas Stihl AG & Co. KG, Waiblingen (DE)

(72) Inventors: Malte Von Hofen, Stuttgart (DE); Alexander Nordmann, Stuttgart (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 167 days.

(21) Appl. No.: 16/723,141

(22) Filed: Dec. 20, 2019

(65) Prior Publication Data

US 2020/0220232 A1 Jul. 9, 2020

(30) Foreign Application Priority Data

Jan. 7, 2019 (EP) ..................... 19150519

(51) Int. Cl.
*H01M 10/48* (2006.01)
*H01M 50/30* (2021.01)
*H01M 50/10* (2021.01)

(52) U.S. Cl.
CPC ....... *H01M 10/482* (2013.01); *H01M 10/486* (2013.01); *H01M 2220/30* (2013.01)

(58) Field of Classification Search
CPC ...... H01M 10/48; H01M 10/24; H01M 10/10; H01M 50/10
See application file for complete search history.

(56) References Cited

U.S. PATENT DOCUMENTS

| 2009/0111015 A1* | 4/2009 | Wood | H01M 50/20 429/164 |
|---|---|---|---|
| 2009/0130545 A1 | 5/2009 | Wood et al. | |
| 2010/0255355 A1 | 10/2010 | Park et al. | |
| 2010/0320969 A1* | 12/2010 | Sakakibara | H01M 10/425 320/118 |
| 2012/0009446 A1* | 1/2012 | Mizuguchi | H01M 10/613 429/71 |
| 2013/0011706 A1 | 1/2013 | Wood et al. | |
| 2013/0337299 A1 | 12/2013 | Sugawara | |

(Continued)

FOREIGN PATENT DOCUMENTS

DE 20 2010 012 151 U1 11/2010
DE 10 2012 209 174 A1 12/2013

(Continued)

OTHER PUBLICATIONS

Machine Translation of: JP 2011/108379A, Okada et al., Jun. 2, 2011.*

(Continued)

*Primary Examiner* — Kenneth J Douyette
(74) *Attorney, Agent, or Firm* — Crowell & Moring LLP

(57) ABSTRACT

A rechargeable battery pack has a cell block. The cell block has a plurality of rechargeable battery cells, wherein at least some of the rechargeable battery cells are physically arranged consecutively from a first cell block end of the cell block in at least a first direction to a second cell block end of the cell block and are electrically connected in series. The battery pack includes an electronics unit, wherein the electronics unit has a measurement electronics part.

20 Claims, 4 Drawing Sheets

(56) References Cited

U.S. PATENT DOCUMENTS

| | | |
|---|---|---|
| 2014/0227570 A1 | 8/2014 | Hoshi et al. |
| 2015/0010808 A1 | 1/2015 | Shoji |
| 2015/0050532 A1 | 2/2015 | Waigel et al. |
| 2015/0056483 A1 | 2/2015 | Ogasawara et al. |
| 2015/0132634 A1 | 5/2015 | Sera et al. |
| 2015/0255773 A1 | 9/2015 | Yoshinari et al. |
| 2015/0303435 A1 | 10/2015 | Ikeda et al. |
| 2016/0049703 A1 | 2/2016 | Lobert et al. |
| 2016/0315359 A1 | 10/2016 | Tyler et al. |
| 2017/0194771 A1 | 7/2017 | Aoki |
| 2018/0364108 A1 | 12/2018 | Tanaka et al. |

FOREIGN PATENT DOCUMENTS

| | | |
|---|---|---|
| DE | 10 2015 206 750 A1 | 10/2015 |
| JP | 2011-108379 A | 6/2011 |
| JP | 2015-201363 A | 11/2015 |
| WO | WO 2007/050265 A1 | 5/2007 |
| WO | WO 2008/038916 A1 | 4/2008 |
| WO | WO 2016/171783 A1 | 10/2016 |

OTHER PUBLICATIONS

"Interlock." Merriam-Webster.com Dictionary, Merriam-Webster, https://www.merriam-webster.com/dictionary/interlock. Accessed May 7, 2021 (Year: 2021) (two (2) pages).

European Search Report issued in counterpart European Application No. 19150504.9 dated Jul. 29, 2019 with partial English translation (nine (9) pages).

European Search Report issued in counterpart European Application No. 19150509.8 dated Jul. 29, 2019 with partial English translation (10 pages).

European Search Report issued in counterpart European Application No. 19150519.7 dated Jun. 17, 2019 with partial English translation (10 pages).

* cited by examiner

RECHARGEABLE BATTERY PACK AND GARDENING AND/OR FORESTRY WORK SYSTEM

CROSS REFERENCE TO RELATED APPLICATIONS

This application claims priority under 35 U.S.C. § 119 from European Patent Application No. 19150519.7, filed Jan. 7, 2019, the entire disclosure of which is herein expressly incorporated by reference.

This application contains subject matter related to U.S. application Ser. No. 16/723,282, entitled "Construction, Rechargeable Battery Pack, and Garden and/or Forest Tending System" and U.S. application Ser. No. 16/723,295, entitled "Cell Connector Structure, Rechargeable Battery Pack and Gardening and/or Forestry Work System," filed on even date herewith, the entire disclosures of which are herein incorporated by reference.

BACKGROUND AND SUMMARY OF THE INVENTION

The invention relates to a rechargeable battery pack for supplying electrical drive power to an electrically driven gardening and/or forestry work appliance and to a gardening and/or forestry work system having such a rechargeable battery and an electrically driven gardening and/or forestry work appliance.

The invention is based on the object of providing a rechargeable battery pack for supplying drive power to an electrically driven gardening and/or forestry work appliance, wherein the rechargeable battery pack is relatively insensitive to electrical, in particular electromagnetic, interference influences, in particular with a space-saving design at the same time, and providing a gardening and/or forestry work system having such a rechargeable battery pack and an electrically driven gardening and/or forestry work appliance.

The invention achieves this and other objects by providing a rechargeable battery pack and a gardening and/or forestry work system, according to the claimed invention.

The rechargeable battery pack according to the invention is designed or configured for supplying, in particular automatically, electrical drive power to an electrically driven gardening and/or forestry work appliance. The rechargeable battery pack has a cell block and an electronics unit. The cell block has a plurality of rechargeable battery cells, in particular for the electrical drive power. At least some of the rechargeable battery cells are physically arranged consecutively or successively from a first cell block end of the cell block in at least a first, in particular straight, direction to a second cell block end, which is in particular different from the first, of the cell block and are electrically connected in series. The electronics unit has a measurement electronics part.

In addition, one, in particular at least one, of the rechargeable battery cells at the first cell block is at earth potential. The measurement electronics part, in particular all of the measurement electronics part, is physically arranged in the region of the first cell block end, in particular at the first cell block end.

In addition or as an alternative, the rechargeable battery pack has a first electrical power line and a second electrical power line, which is in particular different from the first, in particular for the electrical drive power. The second electrical power line is electrically connected to one, in particular at least one, of the rechargeable battery cells at the second cell block end. The first electrical power line runs at the second cell block end from a first cell block side of the cell block in a second, in particular straight, direction that is not parallel, in particular orthogonal, to the first direction to a second cell block side of the cell block opposite to or facing away from the first cell block side and on the second cell block side counter to the first direction to the first cell block end and is electrically connected to one, in particular at least one, of the rechargeable battery cells at the first cell block end. The measurement electronics part, in particular all of the measurement electronics part, is physically arranged on the first cell block side spaced apart from the second cell block end counter to the first direction.

The rechargeable battery pack, in particular the physical arrangement of the measurement electronics part, enables an electrically, in particular electromagnetically, compatible function of the measurement electronics part and therefore an interference-proof design of the rechargeable battery pack, in particular with a space-saving design at the same time. In particular, the measurement electronics part may be relatively sensitive to interference. In detail, the arrangement of the measurement electronics part enables a reduction or even a prevention of electrical, in particular electromagnetic, interference influences, in particular a penetration by an electrical, in particular electromagnetic, field, generated by a maximum potential and/or a current, in particular a current pulse of up to several hundred amperes or even several thousand amperes in the event of disconnection, in particular in the event of short-circuit disconnection, through the first electrical power line and/or the second electrical power line to the measurement electronics. Therefore, the measurement electronics part may not or does not have to have an electrical, in particular electromagnetic, shield. The rechargeable battery pack may therefore be relatively cost-effective.

In particular, the cell block can have a rectangular cross section. In addition or as an alternative, a length of the cell block in the first direction may be greater than, in particular may be at least twice as great as, a width of the cell block in the second direction. In addition or as an alternative, the cell block can have an, in particular the, length in the first direction of a minimum of ten centimeters (cm), in particular a minimum of fifteen cm, and/or a maximum of fifty cm, in particular a maximum of forty cm. Furthermore in addition or as an alternative, the cell block can have an, in particular the, width in the second direction of a minimum of three cm, in particular a minimum of five cm, and/or a maximum of twenty cm, in particular a maximum of fifteen cm.

The rechargeable battery cells may each be individual rechargeable storage elements for electrical energy on an electrochemical basis. In addition or as an alternative, the rechargeable battery cells may be lithium ion rechargeable battery cells. Furthermore in addition or as an alternative, the rechargeable battery cells may be identical, in particular of identical type and/or design. Furthermore in addition or as an alternative, the cell block may have in the first direction a minimum of six, in particular a minimum of eight, and/or a maximum of ten and/or overall a minimum of fifteen, in particular a minimum of twenty, in particular a minimum of twenty-five, in particular thirty, rechargeable battery cells.

The second cell block end may be opposite or facing away from the first cell block end. In addition or as an alternative, the first cell block end can be defined by one end of one of the rechargeable battery cells and/or the second cell block end can be defined by one end of one of the rechargeable battery cells, in particular another of the rechargeable battery cells. Furthermore in addition, the first cell block side can be defined by one side of one of the rechargeable battery cells and/or the second cell block side can be defined by one end of one of the rechargeable battery cells, in particular another of the rechargeable battery cells.

The rechargeable battery pack, in particular the electronics unit, may have just one single measurement electronics part. In addition or as an alternative, the measurement electronics part may be referred to as analogue part. Furthermore in addition or as an alternative, the measurement electronics part may be designed or configured for measuring, in particular automatically, and/or for evaluating, in particular automatically, measurement signals. Furthermore in addition or as an alternative, the rechargeable battery pack, in particular the electronics unit, may have sensor and/or tap elements, which may be physically arranged somewhere else to the measurement electronics part. In particular, the measurement electronics part may be electrically connected to the sensor and/or tap elements. Furthermore in addition or as an alternative, the measurement electronics part may not or does not have to be electrically connected, in particular directly, to the first electrical power line and to the second electrical power line, if present.

The earth potential may be referred to as potential, in particular cell potential, zero or ground. In addition or as an alternative, the earth potential may constitute the reference potential for all measurement and/or power voltages. Furthermore in addition or as an alternative, the measurement electronics part may be at earth potential. Furthermore in addition or as an alternative, one, in particular at least one, in particular other, of the rechargeable battery cells at the second cell block end may be at a maximum potential or a maximum voltage.

The first electrical power line and/or the second electrical power line may each be referred to as power supply line and/or may have or be a power cable. In addition or as an alternative, the second electrical power line may run only at the second cell block end. Furthermore in addition or as an alternative, the first electrical power line may run at the first cell block end from the second cell block side counter to the second direction, in particular up to at most a half, in particular at most a quarter, of a path from the second cell block side counter to the second direction to the first cell block side. The first electrical power line may therefore run on a circuit. Furthermore in addition or as an alternative, an electrical power line may not or an electrical power line does not have to run at the first cell block end from the first cell block side in the second direction.

Spaced apart in the region of the first cell block end and/or from the second cell block end can mean that the measurement electronics part may not or does not have to be physically arranged in the region of the second cell block end, in particular at the second cell block end. Furthermore in addition or as an alternative, spaced apart in the region of the first cell block end and/or from the second cell block end can mean that the measurement electronics part can be arranged so as to be physically closer to the first cell block end than to the second cell block end. Furthermore in addition or as an alternative, in the region of the first cell block end can mean that the measurement electronics part can be spaced apart from the first cell block end by a maximum of five cm, in particular a maximum of two cm, in particular a maximum of one cm. Furthermore in addition or as an alternative, spaced apart from the second cell block end can mean that the measurement electronics part can be spaced apart from the second cell block end by a minimum of five cm, in particular a minimum of ten cm, in particular a minimum of fifteen cm.

The measurement electronics part can on the first cell block side be spaced apart from the cell block counter to the second direction by at most a half, in particular at most a quarter, of an, in particular the, width of the cell block and/or a maximum of ten cm, in particular a maximum of five cm, in particular a maximum of two cm, or may even be in contact with the cell block.

The rechargeable battery pack can have a mass of a maximum of 20 kilograms (kg), in particular a maximum of 10 kg, in particular a maximum of 5 kg.

In a development of the invention, the measurement electronics part is designed or configured for measuring, in particular automatically, at least one property or a property value, in particular a temperature and/or a voltage, in particular a medium voltage, of one or more of the rechargeable battery cells. This makes it possible to identify the event of a problem in one or more of the rechargeable battery cells. In particular, the rechargeable battery pack, in particular the electronics unit, can have temperature sensor and/or voltage tap elements, in particular medium-voltage tap elements. In addition or as an alternative, the rechargeable battery pack, in particular the electronics unit, in particular the measurement electronics part, can be designed or configured to control, in particular automatically, a disconnection of the rechargeable battery pack, in particular a supply of electrical drive power, when an upper temperature limit value is exceeded and/or when a lower temperature limit value is undershot by the measured temperature and/or when an upper voltage limit value is exceeded and/or when a lower voltage limit value is undershot by the measured voltage.

In a development of the invention, the measurement electronics part has at least one voltage divider and/or at least one capacitor and/or at least one operational amplifier and/or at least one microcontroller.

In a development of the invention, the rechargeable battery pack has a number, in particular a plurality, of, in particular electrical, measurement lines. The measurement electronics part is electrically connected, in particular directly, to the number of measurement lines. The number of measurement lines runs at the first cell block end from the first cell block side of the cell block in the second direction to the rechargeable battery cells, in particular and is electrically connected to one, in particular at least one, of the rechargeable battery cells. In particular, the number of measurement lines can be referred to in each case as measurement signal line and/or can have or be a measurement cable. In addition or as an alternative, the number of measurement lines may be different from the first electrical power line and the second electrical power line. Furthermore in addition or as an alternative, the measurement electronics part may be electrically connected by means of the number of measurement lines to the sensor and/or tap elements, if present. Furthermore in addition or as an alternative, at least one of the number of measurement lines, in particular on the second cell block side and/or from the first cell block end, can run in the first direction. Furthermore in addition or as an alternative, a measurement line may not or a measurement line does not have to run at the second cell block end.

In a development of the invention, the electronics unit has a power electronics part, which is in particular different from the measurement electronics part, in particular for the electrical drive power.

In addition, the power electronics part, in particular all of the power electronics part, is physically arranged in the region of the second cell block end, in particular at the second cell block end, in particular and one, in particular at least one, of the rechargeable battery cells at the second cell block end is at an, in particular the, maximum potential.

In addition or as an alternative, the power electronics part, in particular all of the power electronics part, is electrically connected in particular directly, to the first electrical power line and second electrical power line, and, in particular on the first cell block side, is physically arranged spaced apart from the first cell block end and/or from the measurement electronics part in the first direction.

The physical arrangement of the power electronics part makes possible a space-saving design.

In particular, the power electronics part can be relatively insensitive to interference or relatively resilient to interference. In addition or as an alternative, the rechargeable battery pack, in particular the electronics unit, may have just one single power electronics part. Furthermore in addition or as an alternative, the power electronics part may be referred to as digital part. Furthermore in addition or as an alternative, the power electronics part may not or does not have to be electrically connected, in particular directly, to the sensor and/or tap elements, if present. Furthermore in addition or as an alternative, the power electronics part may not or does not have to be electrically connected, in particular directly, to the number of measurement lines, if present.

Spaced apart in the region of the second cell block end and/or from the first cell block end and/or from the measurement electronics part can mean that the power electronics part may not or does not have to be physically arranged in the region of the first cell block and/or the measurement electronics part, in particular at the first cell block end. Furthermore in addition or as an alternative, in the region of the second cell block end and/or from the first cell block end and/or from the measurement electronics part can mean that the power electronics part can be arranged so as to be physically closer to the second cell block end than to the first cell block end and/or the measurement electronics part. Furthermore in addition or as an alternative, in the region of the second cell block end can mean that the power electronics part can be spaced apart from the second cell block end by a maximum of five cm, in particular a maximum of two cm, in particular a maximum of one cm. Furthermore in addition or as an alternative, spaced apart from the first cell block end and/or from the measurement electronics part can mean that the power electronics part can be spaced apart from the first cell block end and/or from the measurement electronics part by a minimum of five cm, in particular a minimum of ten cm, in particular a minimum of fifteen cm.

The power electronics part can on the first cell block side be spaced apart from the cell block counter to the second direction by at most a half, in particular at most a quarter, of and, in particular the, width of the cell block and/or a maximum of ten cm, in particular a maximum of five cm, in particular a maximum of two cm, or may even be in contact with the cell block.

In one configuration of the invention, the power electronics part is designed or configured to transform, in particular automatically, and/or to switch, in particular automatically, the electrical drive power, in particular the power electronics part has at least one circuit breaker. This makes it possible to disconnect the supply of electrical drive power in the event of a problem, in particular in the event of a short circuit and/or with one or more of the rechargeable battery cells. In particular, the rechargeable battery pack, in particular the electronics unit, in particular the measurement electronics part, can be designed or configured to control, in particular automatically, the power electronics part. In addition or as an alternative, the circuit breaker may have or be a power MOSFET.

In a development of the invention, the measurement electronics part extends by way of a first measurement electronics part end, in particular at least, up to the first cell block end, in particular and not beyond there.

In addition or as an alternative, the measurement electronics part extends by way of a second measurement electronics part end, which is in particular different from the first, up to at most a half, in particular at most a quarter, of an, in particular straight, path from the first cell block end in the first direction to the second cell block end.

In addition or as an alternative, the power electronics part extends by way of a first power electronics part end, in particular at least, up to the second cell block end, in particular and not beyond there.

In addition or as an alternative, the power electronics part extends by way of a second power electronics part end, which is in particular different from the first, up to at most a half, in particular at most a quarter, of an, in particular straight, path from the second cell block end counter to the first direction to the first cell block end.

This makes possible a space-saving design.

In particular, the second measurement electronics part end may be opposite or facing away from the first measurement electronics part end. In addition or as an alternative, the second power electronics part end may be opposite or facing away from the first power electronics part end.

In one configuration of the invention, the electronics unit has one, in particular at least one, printed circuit board. The printed circuit board carries the measurement electronics part and/or the power electronics part. The printed circuit board is physically arranged with a printed circuit board plane parallel to the first cell block side and/or orthogonal to the second direction. This makes possible a space-saving design.

In one configuration of the invention, the electronics unit has an, in particular the, common printed circuit board. The common printed circuit board carries the measurement electronics part and the power electronics part. In particular, the rechargeable battery pack, in particular the electronics unit, may have just one single printed circuit board.

In a development of the invention, the rechargeable battery cells are, in particular elongate, round cells. The round cells are are each physically arranged with a round cell longitudinal axis not in parallel, in particular orthogonal, to the first direction and/or to the second direction and/or in a third, in particular straight, direction not parallel, in particular orthogonal, to the the first and second direction.

In addition or as an alternative, at least some of the rechargeable battery cells are physically arranged consecutively or successively, in particular from the first cell block side, in the second direction, in particular to the second cell block side, in particular and are electrically connected in parallel.

In addition or as an alternative, the cell block is cuboidal.

This makes possible a relatively simple interconnection of the rechargeable battery cells and/or a space-saving design.

In particular, an, in particular respective, length of the round cells may be greater than an, in particular respective, diameter of the round cells. In addition or as an alternative, the cell block may have in the second direction a minimum of two and/or a maximum of five rechargeable battery cells. Furthermore in addition or as an alternative, an, in particular the, length of the cell block in the first direction may be greater than, in particular may be at least twice as great as, a height of the cell block in the third direction. Furthermore in addition or as an alternative, the cell block can have an, in particular the, height in the third direction of a minimum of three cm, in particular a minimum of five cm, and/or a maximum of twenty cm, in particular a maximum of fifteen cm.

In a development of the invention, the rechargeable battery pack has at least one further cell block. The at least one further cell block is physically arranged on the second cell block side in the second direction.

In addition, one, in particular at least one, of the rechargeable battery cells of the at least one further cell block at a first cell block end of the at least one further cell block is at an, in particular the, earth potential, in particular and, one, in particular at least one, in particular other, of the rechargeable battery cells of the at least one further cell block at a second cell block end of the at least one further cell block is at a, in particular the, maximum potential.

In addition or as an alternative, the rechargeable battery pack has at least one further first electrical power line, in particular power cable, and at least one further second electrical power line, in particular different from the first, in particular power cable, in particular for the electrical drive power. The at least one further second electrical power line is electrically connected to, in particular at least, one of the rechargeable battery cells of the at least one further cell block at the second cell block end. The at least one further first electrical power line runs on the second cell block end of the cell block from the first cell block side of the cell block in the second direction at least to the second cell block side of the cell block and, in particular on a second cell block side of the at least one further cell block, counter to the first direction to the first cell block end of the at least one further cell block and is electrically connected to one, in particular at least one, of the rechargeable battery cells of the at least one further cell block on the first cell block end.

In particular, the cell block and the at least one further cell block may be identical, in particular of identical type and/or design. In addition or as an alternative, a further cell block may not or a further cell block does not have to be physically arranged on the first cell block side counter to the second direction. Furthermore in addition or as an alternative, the first cell block end of the cell block and the first cell block end of the at least one further cell block may be physically arranged next to one another. Furthermore in addition or as an alternative, the second cell block end of the cell block and the second cell block end of the at least one further cell block may be physically arranged next to one another. Furthermore in addition or as an alternative, the measurement electronics part may not or does not have to be electrically connected, in particular directly, to the at least one further first electrical power line and to the at least one further second electrical power line, if present. Furthermore in addition or as an alternative, the at least one further second electrical power line may run only at the second cell block end. Furthermore in addition or as an alternative, the at least one further first electrical power line can run at the first cell block end, in particular from the second cell block side, counter to or in the second direction. Furthermore in addition or as an alternative, the power electronics part may be electrically connected, in particular directly, to the at least one further first electrical power line and to the at least one further second electrical power line.

In a development of the invention, a maximum electrical drive power, in particular of the rechargeable battery pack, is a minimum of 50 watts (W) and/or a maximum of five kilowatts (kW).

In addition or as an alternative, the maximum potential, in particular of the rechargeable battery pack, is a minimum of 10 volts (V), in particular a minimum of 20 V, and/or a maximum of 500 V, in particular a maximum of 100 V.

In addition or as an alternative, a maximum energy content, in particular of the rechargeable battery pack, is a minimum of 80 watt hours (Wh) and/or a maximum of 5 kilowatt hours (kWh).

The gardening and/or forestry work system according to the invention has an, in particular the, rechargeable battery pack as described above and an electrically driven gardening and/or forestry work appliance. The rechargeable battery pack and the electrically driven gardening and/or forestry work appliance are designed or configured for electrical connection to one another for supplying, in particular automatically, electrical drive power from the rechargeable battery pack to the electrically driven gardening and/or forestry work appliance.

In particular, the gardening and/or forestry work appliance may have an electric drive motor. In addition or as an alternative, the gardening and/or forestry work appliance may be a manually controlled, in particular hand-held or floor-based, gardening and/or forestry work appliance. In particular, manually controlled, in particular hand-held, gardening and/or forestry work appliance can mean that the gardening and/or forestry work appliance can have a mass of at most 50 kg, in particular of at most 20 kg, in particular of at most 10 kg. Furthermore in addition or as an alternative, the rechargeable battery pack and the gardening and/or forestry work appliance can be designed or configured for being electrically connected to one another, in a releasable manner, in particular without tools and/or without destruction, in particular by means of plug connectors. Furthermore in addition or as an alternative, the rechargeable battery pack and the gardening and/or forestry work appliance can be designed or configured for being mechanically connected to one another, in particular in a releasable manner, in particular without tools and/or without destruction. In particular, the gardening and/or forestry work appliance can be designed or configured for carrying the rechargeable battery pack. Furthermore in addition or as an alternative, an, in particular the, short circuit can be caused by the gardening and/or forestry work appliance.

In a development of the invention, the gardening and/or forestry work system has a harness. The harness is designed or configured for carrying the rechargeable battery pack, in particular on the back of a user. In particular, the harness and the rechargeable battery pack can be designed or configured for being mechanically connected to one another, in particular in a releasable manner, in particular without tools and/or without destruction. In addition or as an alternative, the gardening and/or forestry work system, in particular the harness, may have an electrical connecting cable for electrically connecting the rechargeable battery pack and the gardening and/or forestry work appliances to one another.

In one development of the invention, the electrically driven gardening and/or forestry work appliance is a saw, a pole-mounted pruner, a brush cutter, a hedge trimmer, a hedge cutter, a blower, a leaf blower, a lopper, an angle grinder, a sweeping appliance, a sweeping roller, a sweeping brush, a lawnmower, a scarifier or a grass trimmer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
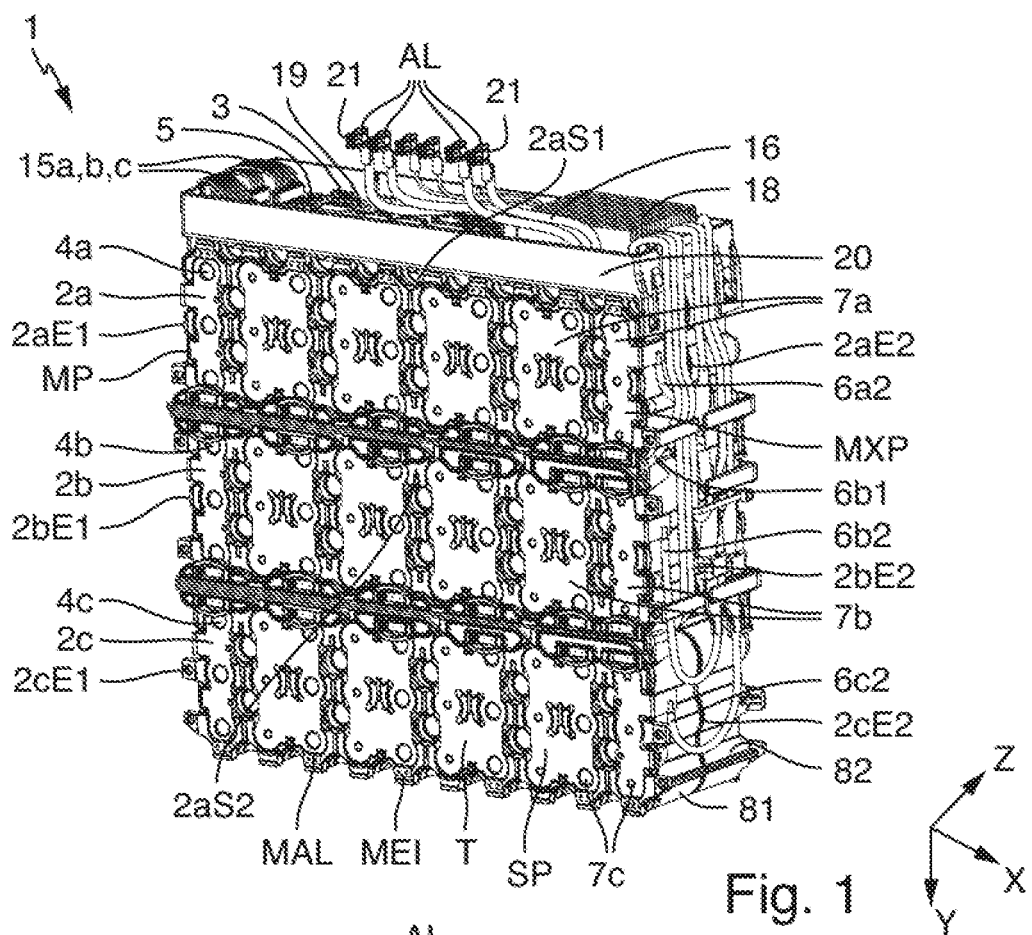
FIG. 1 shows a perspective view of a rechargeable battery pack according to the invention with plug connectors and without a housing.

FIGS. 1 to 8 show a rechargeable battery pack 1 for supplying electrical drive power AL to an electrically driven gardening and/or forestry work appliance 101. The rechargeable battery pack 1 has a cell block 2a and an electronics unit 3. The cell block 2a has a plurality of rechargeable battery cells 4a. At least some of the rechargeable battery cells 4a are physically arranged consecutively from a first cell block end 2aE1 of the cell block 2a in at least a first direction x to a second cell block end 2aE2 of the cell block 2a and are electrically connected in series. The electronics unit 3 has a measurement electronics part 5.

In addition, one, in particular at least one, of the rechargeable battery cells 4a, in particular the negative pole thereof, at the first cell block end 2aE1 is at earth potential MP, in particular at 0 V. The measurement electronics part 5 is physically arranged in the region of the first cell block end 2aE1.

Furthermore, one, in particular at least one, of the rechargeable battery cells 4a, in particular the positive pole thereof, at the second cell block end 2aE2 is at a maximum potential MXP, in the exemplary embodiment shown at a maximum of 42 V. In alternative exemplary embodiments, the maximum potential may be at a minimum of 10 V and/or at a maximum of 500 V.

In addition or as an alternative, the rechargeable battery pack 1 has a first electrical power line 6a1 and a second electrical power line 6a2. The second electrical power line 6a2 is electrically connected to one, in particular at least one, of the rechargeable battery cells 4a at the second cell block end 2aE2. The first electrical power line 6a1 runs at the second cell block end 2aE2 from a first cell block side 2aS1 of the cell block 2a in a second direction y that is not parallel, in particular orthogonal, to the first direction to a second cell block side 2aS2 of the cell block 2a opposite to and/or parallel to the first cell block side and on the second cell block side 2aS2 counter to the first direction x to the first cell block end 2aE1 and is electrically connected to one, in particular at least one, of the rechargeable battery cells 4a at the first cell block end 2aE1. The measurement electronics part is physically arranged on the first cell block side 2aS1 spaced apart from the second cell block end 2aE2 counter to the first direction x.

Figure 2:
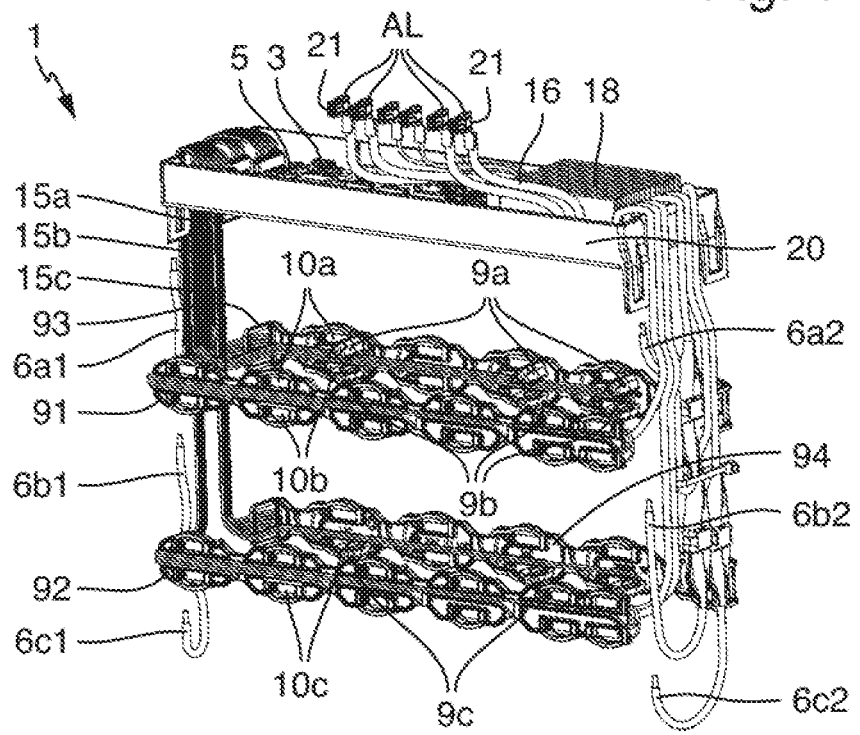
FIG. 2 shows a further perspective view of the rechargeable battery pack of FIG. 1 with plug connectors, without cell blocks and without a housing.
Figure 3:
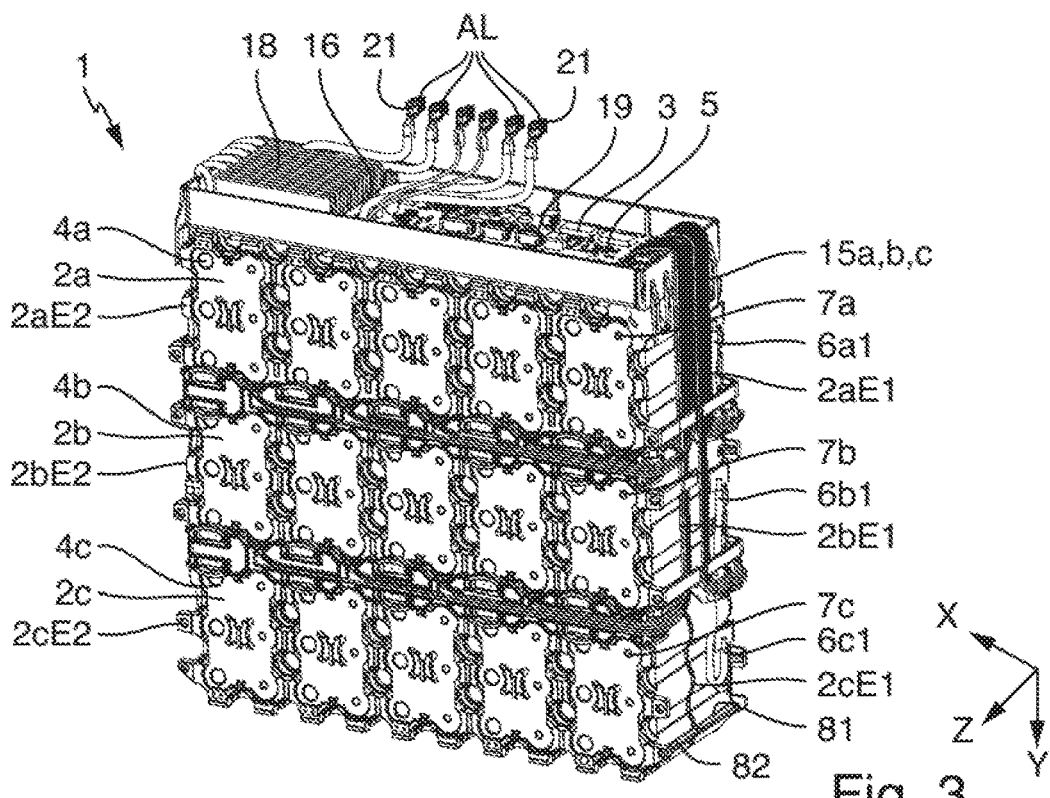
FIG. 3 shows a further perspective view of an opposite side of the rechargeable battery pack of FIG. 1 with plug connectors and without a housing.

Furthermore, the first electrical power line 6a1 runs at the first cell block end 2aE1 from the second cell block side 2aS2 counter to the second direction y, as shown in FIGS. 2 and 3.

The rechargeable battery pack 1 also has at least one further cell block 2b, 2c. The at least one further cell block 2b, 2c is physically arranged on the second cell block side 2aS2 in the second direction y.

In the exemplary embodiment shown, the rechargeable battery pack 1 has two further cell blocks 2b, 2c. In alternative exemplary embodiments, the rechargeable battery pack may have no further cell block, only one single further cell block or at least three further cell blocks.

In detail, the further cell block 2b with a first cell block side 2bS1 is physically arranged on the second cell block side 2aS2 of the cell block 2a in the second direction y, in particular parallel to the second cell block side 2aS2. In detail, the further cell block 2c with a first cell block side 2cS1 is physically arranged on a second cell block side 2bS2 of the cell block 2b in the second direction y, in particular parallel to the second cell block side 2bS2.

In addition, one, in particular at least one, of the rechargeable battery cells 4b, 4c, in particular the negative pole thereof, of the at least one further cell block 2b, 2c at a first cell block end 2bE1, 2cE1 of the at least one further cell block 2b, 2c is at the earth potential MP.

Furthermore, one, in particular at least one, of the rechargeable battery cells 4b, 4c, in particular the positive pole thereof, of the at least one further cell block 2b, 2c at a second cell block end 2bE1, 2cE1 of the at least one further cell block 2b, 2c is at the maximum potential MXP.

In addition or as an alternative, the rechargeable battery pack 1 has at least one further first electrical power line 6b1, 6c1 and at least one further second electrical power line 6b2, 6c2. The at least one further second electrical power line 6b2, 6c2 is electrically connected to one, in particular at least one, of the rechargeable battery cells 4b, 4c of the at least one further cell block 2b, 2c at the second cell block end 2bE2, 2cE2. The at least one further first electrical power line 6b1, 6c1 runs on the second cell block end 2aE2 of the cell block 2a from the first cell block side 2aS1 of the cell block 2a in the second direction y at least to the second cell block side 2aS2 of the cell block 2a and, in particular on the second cell block side 2bS2 of the at least one further cell block 2b, counter to the first direction x to the first cell block end 2bE1, 2cE1 of the at least one further cell block 2b, 2c and is electrically connected to one, in particular at least one, of the rechargeable battery cells 4b, 4c of the at least one further cell block 2b, 2c on the first cell block end 2bE1, 2cE1.

In detail, the first cell block end 2aE1 of the cell block 2a and the first cell block end 2bE1, 2cE1 of the at least one further cell block 2b, 2c are physically arranged next one another. Furthermore, the second cell block end 2aE2 of the cell block 2a and the second cell block end 2bE2, 2cE2 of the at least one further cell block 2b, 2c are physically arranged next one another.

The further first electrical power line 6b1 also runs on the second cell block side 2bS2 of the further cell block 2b and on the first cell block side 2cS1 of the further cell block 2c counter to the first direction x to the first cell block end 2bE1 and at the first cell block end 2bE1 counter to the second direction y, as shown in FIGS. 2 and 3. In addition, the further first electrical power line 6c1 runs on the second cell block side 2bS2 of the further cell block 2b and on the first cell block side 2cS1 of the further cell block 2c counter to the first direction x to the first cell block end 2cE1 and at the first cell block end 2cE1 in the second direction y.

Furthermore, the rechargeable battery cells 4a, 4b, 4c are, in particular elongate, round cells. The round cells 4a, 4b, 4c are each physically arranged with a round cell longitudinal axis LA not in parallel, in particular orthogonal, to the first direction x and/or to the second direction y and/or in a third direction z not parallel, in particular orthogonal, to the the first and second direction, as shown in FIGS. 1, 3, 4A and 4B.

In addition or as an alternative, at least some of the rechargeable battery cells 4a, 4b, 4c are physically arranged consecutively in the second direction y, in particular and are electrically connected in parallel, as shown in FIGS. 1 and 3.

In addition or as an alternative, the cell block 2a, 2b, 2c is cuboidal.

In the exemplary embodiment shown, the, in particular at least one further, cell block 2a, 2b, 2c has a length in the first direction x of 27 cm. Furthermore, the, in particular at least one further, cell block 2a, 2b, 2c has a width in the second direction y of 9 cm. The, in particular at least one further, cell block 2a, 2b, 2c also has a height in the third direction z of 8 cm.

Figure 4A:
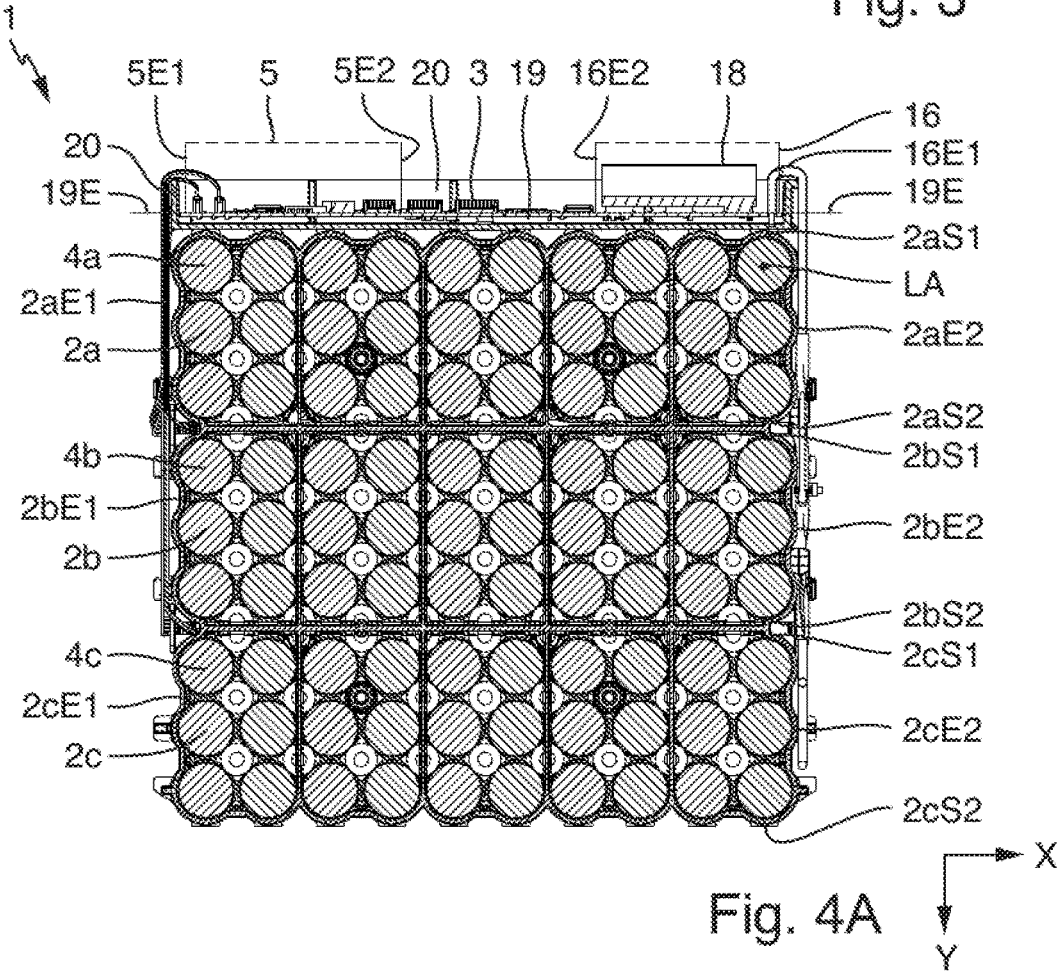
FIG. 4A shows a sectional view in a first direction and in a second direction of the rechargeable battery pack of FIG. 1 without plug connectors and without a housing.
Figure 4B:
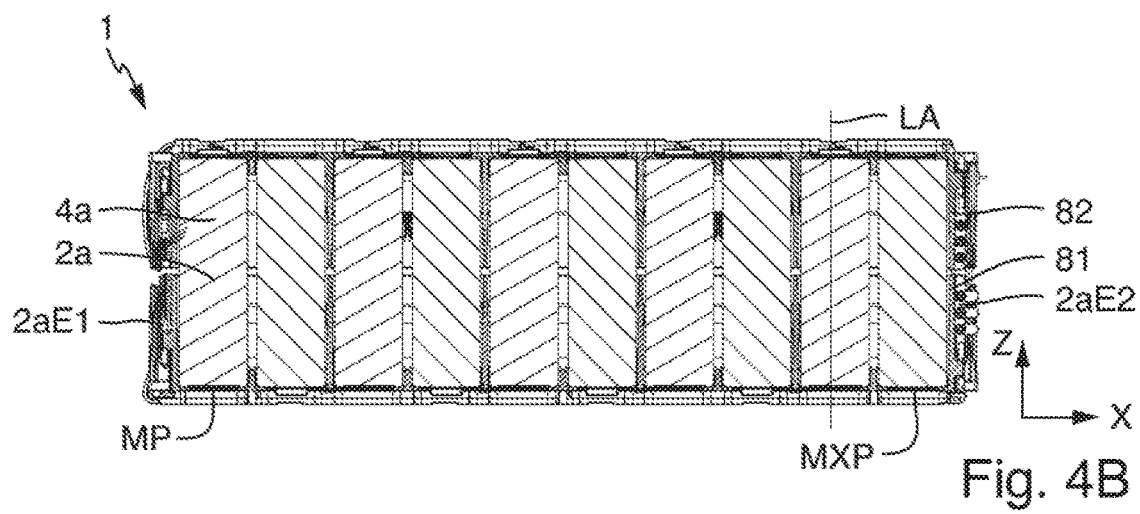
FIG. 4B shows a further sectional view in a first direction and in a third direction of the rechargeable battery pack of FIG. 1 without a housing.

In addition, in the exemplary embodiment shown, the, in particular at least one further, cell block 2a, 2b, 2c has in the first direction x ten rechargeable battery cells 4a, 4b, 4c, as shown in FIGS. 4A and 4B. Furthermore, the, in particular at least one further, cell block 2a, 2b, 2c has in the second direction y three rechargeable battery cells 4a, 4b, 4c.

Furthermore, in the exemplary embodiment shown, the rechargeable battery cells 4a, 4b, 4c are electrically connected in series and in parallel by means of cell connectors 7a, 7b, 7c, in particular in the form of metal cell connector sheets, as shown in FIGS. 1 and 3.

In detail, the, in particular at least one further, first electrical power line 6a1, 6b1, 6c1 and the, in particular at least one further, second electrical power line 6a2, 6b2, 6c2 are electrically connected, in particular in each case, to one of the cell connectors 7a, 7b, 7c.

In the exemplary embodiment shown, a maximum electrical drive power MAL, in particular of the rechargeable battery pack 1, is a minimum of 50 W and/or a maximum of 5 kW.

In the exemplary embodiment shown, a maximum energy content MEI, in particular of the rechargeable battery pack 1, is also 1.5 kWh. In alternative exemplary embodiments, a maximum energy content may be a minimum of 80 Wh and/or a maximum of 5 kWh.

In addition, in the exemplary embodiment shown, the rechargeable battery pack 1 has at least one cell holder 81, 82, wherein the, in particular at least one further, cell block 2a, 2b, 2c or the rechargeable battery cells 4a, 4b, 4c is or are held together by way of the at least one cell holder 81, 82.

In detail, the cell connectors 7a, 7b, 7c are mounted on, in particular in, the at least one cell holder 81, 82.

Furthermore, the, in particular at least one further, first electrical power line 6a1, 6b1, 6c1 and the, in particular at least one further, second electrical power line 6a2, 6b2, 6c2 are mounted on, in particular in, the at least one cell holder 81, 82 or are laid over the at least one cell holder 81, 82.

Furthermore, the measurement electronics part 5 is designed to measure at least one property, in particular a temperature T and/or a voltage SP, in particular a medium voltage, of one or more of the rechargeable battery cells 4a, 4b, 4c.

In the exemplary embodiment shown, the rechargeable battery pack 1, in particular the electronics unit 3, has temperature sensor elements 9a, 9b, 9c, in particular in the form of thermistors, and/or voltage tap elements 10a, 10b, 10c, in particular medium-voltage tap elements, in particular in the form of contact tongues. The temperature sensor elements 9a, 9b, 9c and/or the voltage elements 10a, 10b, 10c are physically arranged on one or more of the rechargeable battery cells 4a, 4b, 4c, in particular mounted on, in particular in, the at least one cell holder 81, 82. In particular, the voltage tap elements 10a, 10b, 10c are mounted on, in particular in, at least one pre-assembly body 91, 92, 93, 94 and the at least one pre-assembly body 91, 92, 93, 94 is mounted on the at least one cell holder 81, 82. The voltage tap elements 10a, 10b, 10c are also electrically connected, in particular in each case, to one of the cell connectors 7a, 7b, 7c.

Figure 5:
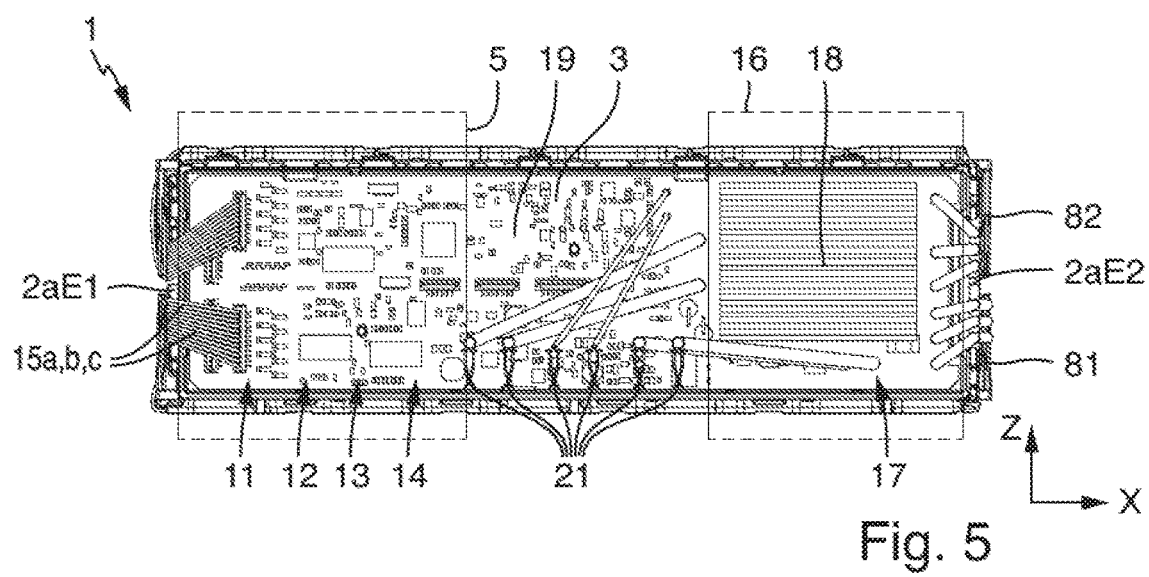
FIG. 5 shows a plan view of an electronics unit of the rechargeable battery pack of FIG. 1 with plug connectors.

In detail, the measurement electronics part 5 has at least one voltage divider 11 and/or at least one capacitor 12 and/or at least one operational amplifier 13 and/or at least one microcontroller 14, as shown in FIG. 5.

In addition, the rechargeable battery pack has a number, in the exemplary embodiment shown a plurality, of measurement lines 15a, 15b, 15c. The measurement electronics part 5 is electrically connected to the number of measurement lines 15a, 15b, 15c. The number of measurement lines 15a, 15b, 15c runs on the first cell block end 2aE1 from the first cell block side 2aS1 of the cell block 2a in the second direction y to the rechargeable battery cells 4a, 4b, 4c.

Furthermore, at least one of the number of measurement lines 15a, 15b runs on the second cell block side 2aS2 of the cell block 2a and on the first cell block side 2bS1 of the further cell block 2b from the first cell block end 2aE1, 2bE1 in the first direction x, as shown in FIGS. 2 and 3. Furthermore, at least one of the number of measurement lines 15b, 15c runs on the second cell block side 2bS2 of the further cell block 2b and on the first cell block side 2cS1 of the further cell block 2c from the first cell block end 2bE1, 2cE1 in the first direction x.

In detail, the number of measurement lines 15a, 15b, 15c are mounted on, in particular in, the at least one cell holder 81, 82 or are laid over the at least one cell holder 81, 82, in particular and mounted on, in particular in, the at least one pre-assembly body 91, 92, 93, 94 or laid over the at least one pre-assembly body 91, 92, 93, 94.

Some of the number of measurement lines 15a, 15b, 15c are also electrically connected to one, in particular at least one, of the rechargeable battery cells 4a, 4b, 4c, in particular by means of, in particular in each case, one of the cell connectors 7a, 7b, 7c and one of the voltage tap elements 10a, 10b, 10c.

In addition, the measurement electronics part 5 is electrically connected to the temperature sensor elements 9a, 9b, 9c and/or to the voltage tap elements 10a, 10b, 10c by means of the number of measurement lines 15a, 15b, 15c.

Furthermore, the electronics unit has a power electronics part 16.

In addition, the power electronics part 16 is physically arranged in the region of the second cell block end 2aE2.

In addition or as an alternative, the power electronics part 16 is electrically connected to the first electrical power line 6a1 and the second electrical power line 6a2 and, in particular on the first cell block side 2aS1, is physically arranged spaced apart from the first cell block end 2aE1 and/or from the measurement electronics part 5 in the first direction x.

Furthermore, the power electronics part 16 is electrically connected to the at least one further first electrical power line 6b1, 6c1 and to the at least one further second electrical power line 6b2, 6c2.

In detail, the power electronics part 16 is designed to transform and/or to switch the electrical drive power AL, in particular the power electronics part 16 has at least one circuit breaker 17.

The electronics unit 3 also has a heat sink 18 for cooling the power electronics part 16, in particular the at least one circuit breaker 17.

In the exemplary embodiment shown, the measurement electronics part 5 extends by way of a first measurement electronics part end 5E1 up to the first cell block end 2aE1.

In addition or as an alternative, the measurement electronics part 5 extends by way of a second measurement electronics part end 5E2 up to at most a half, in particular at most a quarter, of a path from the first cell block end 2aE1 in the first direction x to the second cell block end 2aE2.

In addition or as an alternative, the power electronics part 16 extends by way of a first power electronics part end 16E1 up to the second cell block end 2aE2.

In addition or as an alternative, the power electronics part 16 extends by way of a second power electronics part end 16E2 up to at most a half, in particular at most a quarter, of a path from the second cell block end 2aE2 counter to the first direction x to the first cell block end 2aE1.

In addition, the electronics unit 3 has a common printed circuit board 19. The common printed circuit board 19 carries the measurement electronics part 5 and the power electronics part 16. The common printed circuit board 19 is physically arranged with a printed circuit board plane 19E parallel to the first cell block side 2aS1 and/or orthogonal to the second direction y.

In the exemplary embodiment shown, the electronics unit 3 has an encapsulation cup 20. The common printed circuit board 19 with the measurement electronics part 5 and power electronics part 16 is physically arranged in the encapsulation cup 20 and is encapsulated by means of encapsulation material, in particular to protect against moisture. In particular, at least some of the heat sink 18 is not encapsulated. Furthermore, the encapsulation cup 20 makes contact with the cell block 2a or the at least one cell holder 81, 82.

Furthermore, in the exemplary embodiment shown, the rechargeable battery pack 1, in particular the electronics unit 3, has plug connectors 21, in particular for electrically connecting the rechargeable battery pack 1 to the gardening and/or forestry work appliance 101.

Figure 6:
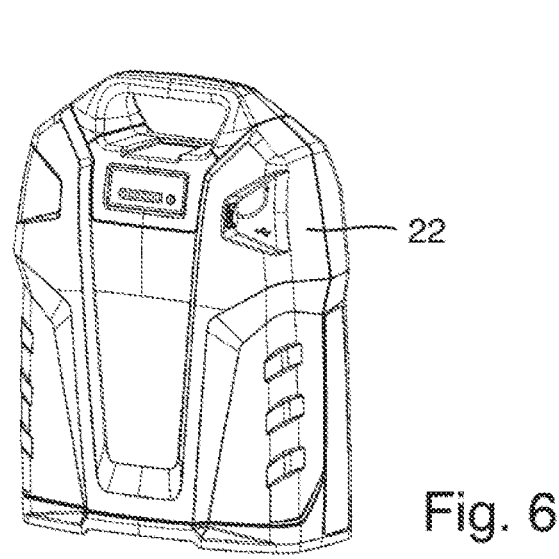
FIG. 6 shows a further perspective view of the rechargeable battery pack of FIG. 1 with a housing.

In the exemplary embodiment shown, the rechargeable battery pack 1 also has a common housing 22, in particular a protective housing, as shown in FIG. 6. The cell block 2a, the electronics unit 3, the first electrical power line 6a1 and the second electrical power line 6a2 are physically arranged in the common housing 22. Also physically arranged in the common housing 22 are the further cell blocks 2b, 2c, the rechargeable battery cells 4a, 4b, 4c, the measurement electronics part 5, the at least one further first electrical power line 6b1, 6c1, the at least one further second electrical power line 6b2, 6c2, the cell connectors 7a, 7b, 7c, the at least one cell holder 81, 82, the temperature sensor elements 9a, 9b, 9c, the voltage tap elements 10a, 10b, 10c, the at least one pre-assembly body 91, 92, 93, 94, the at least one voltage divider 11, the at least one capacitor 12, the at least one operational amplifier 13, the at least one microcontroller 14, the number of measurement lines 15a, 15b, 15c, the power electronics part 16, the at least one circuit breaker 17, the heat sink 18, the common printed circuit board 19, the encapsulation cup 20 and the plug connectors 21.

Figure 7:
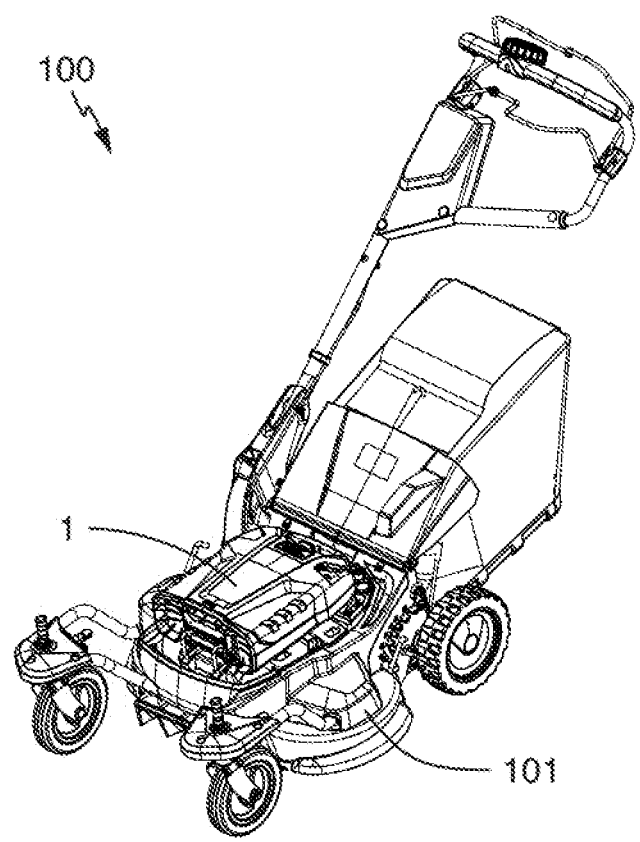
FIG. 7 shows a perspective view of a gardening and/or forestry work system according to the invention having the rechargeable battery pack of FIG. 1 and an electrically driven gardening and/or forestry work appliance in the form of a lawnmower.
Figure 8:
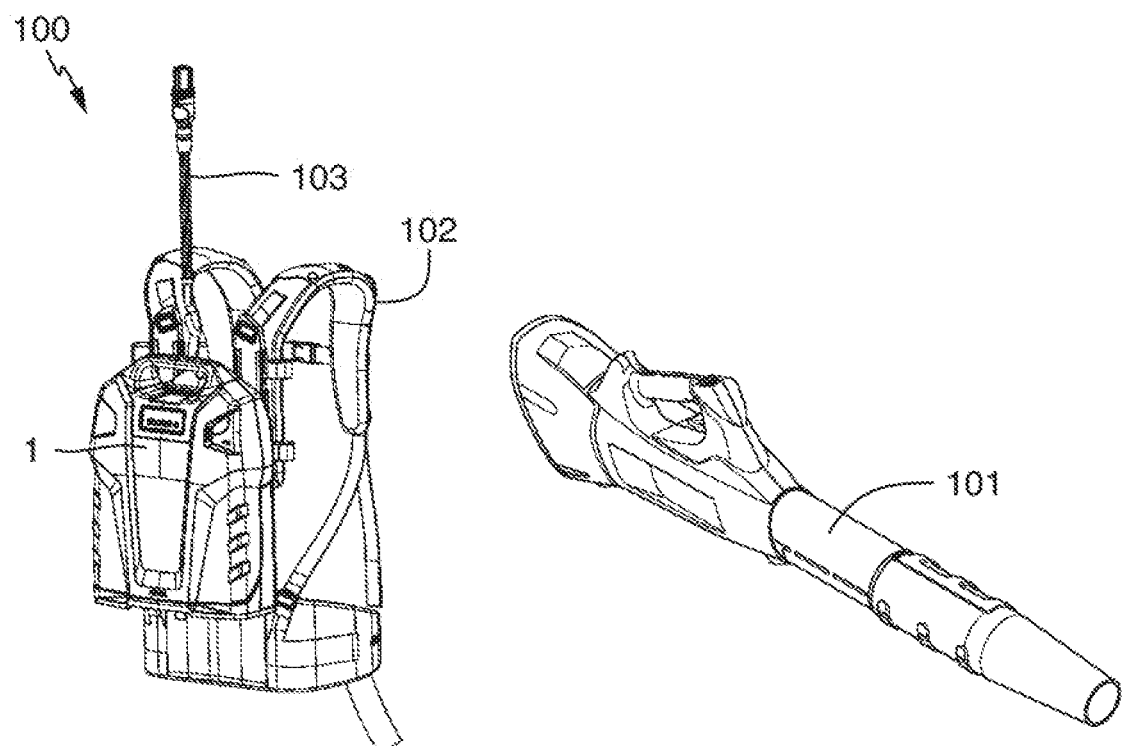
FIG. 8 shows a further perspective view of the gardening and/or forestry work system of FIG. 7 having a further electrically driven gardening and/or forestry work appliance in the form of a blower and a harness for carrying the rechargeable battery pack of FIG. 1.

FIGS. 7 and 8 show a gardening and/or forestry work system 100 according to the invention. The gardening and/or forestry work system 100 has the rechargeable battery pack 1 and the electrically driven gardening and/or forestry work appliance 101. The rechargeable battery pack 1 and the electrically driven gardening and/or forestry work appliance 101 are designed for electrical connection to one another for supplying electrical drive power AL from the rechargeable battery pack 1 to the electrically driven gardening and/or forestry work appliance 101.

In the exemplary embodiment shown, the gardening and/or forestry work system 100 has two gardening and/or forestry work appliances 101. In alternative exemplary embodiments, the gardening and/or forestry work system may have only one single gardening and/or forestry work appliance or at least three gardening and/or forestry work appliances.

In FIG. 7, the gardening and/or forestry work appliance 101 is a lawnmower. In FIG. 8, the gardening and/or forestry work appliance 101 is a blower. In alternative embodiments, the gardening and/or forestry work appliance may be a saw, a pole-mounted pruner, a brush cutter, a hedge trimmer, a hedge cutter, a leaf blower, a lopper, an angle grinder, a sweeping appliance, a sweeping roller, a sweeping brush, a scarifier or a grass trimmer.

The lawnmower 101 is designed to carry the rechargeable battery pack 1.

Furthermore, the gardening and/or forestry work system 100 has a harness 102. The harness 102 is designed to carry the rechargeable battery pack 1.

In addition, the gardening and/or forestry work system 100, in particular the harness 102, has an electrical connecting cable 103 for electrically connecting the rechargeable battery pack 1 and the gardening and/or forestry work appliance 101, in FIG. 8 the blower, to one another.

As the exemplary embodiments show and explained above make clear, the invention provides a rechargeable battery pack for supplying electrical drive power to an electrically driven gardening and/or forestry work appliance, wherein the rechargeable battery pack is relatively insensitive to electrical, in particular electromagnetic, interference influences, in particular with a space-saving design at the same time, and provides a gardening and/or forestry work system having such a rechargeable battery pack and an electrically driven gardening and/or forestry work appliance.

The cell connectors, the at least one cell holder, temperature sensor elements, the voltage tap elements, the at least one pre-assembly body and/or the number of measurement lines may, for example, be such as disclosed in the Applicant's European patent applications 19150504.9 and 19150509.8, which were filed contemporaneously and the content of which is hereby fully incorporated in the disclosure of the present application by reference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rechargeable battery pack that supplies electrical drive power to an electrically driven gardening and/or forestry work appliance, comprising:
a cell block, wherein the cell block has a plurality of rechargeable battery cells, wherein at least some of the rechargeable battery cells are physically arranged consecutively from a first cell block end of the cell block in at least a first direction to a second cell block end of the cell block and are electrically connected in series; and
an electronics unit, wherein the electronics unit has a measurement electronics part,
wherein
the rechargeable battery pack has a first electrical power line and a second electrical power line,
wherein the second electrical power line is electrically connected to one of the rechargeable battery cells at the second cell block end,
wherein the first electrical power line at the second cell block end runs from a first cell block side of the cell block in a second direction, which is not parallel to the first direction, to a second cell block side of the cell block opposite to the first cell block side and on the second cell block side counter to the first direction to the first cell block end and is electrically connected to one of the rechargeable battery cells at the first cell block end, and
wherein the measurement electronics part is physically arranged on the first cell block side spaced apart from the second cell block end counter to the first direction.

2. The rechargeable battery pack according to claim 1, wherein
the measurement electronics part is designed to measure at least one property of one or more of the rechargeable battery cells.

3. The rechargeable battery pack according to claim 2, wherein
the at least one property is at least one of a temperature and a voltage.

4. The rechargeable battery pack according to claim 1, wherein
the measurement electronics part comprises at least one of: a voltage divider, a capacitor, an operational amplifier, and a microcontroller.

5. The rechargeable battery pack according to claim 1, further comprising:
a number of measurement lines,
wherein the measurement electronics part is electrically connected to the number of measurement lines, and
wherein the number of measurement lines at the first cell block end runs from the first cell block side of the cell block in the second direction to the rechargeable battery cells and is electrically connected to one of the rechargeable battery cells.

6. The rechargeable battery pack according to claim 1, wherein
the electronics unit has a power electronics part,
wherein at least one of:
(i) the power electronics part is physically arranged in a region of the second cell block end and one of the rechargeable battery cells at the second cell block end is at a maximum potential, and
(ii) the power electronics part is electrically connected to the first electrical power line and the second electrical power line and, on the first cell block side, is physically arranged spaced apart from the first cell block end and/or from the measurement electronics part in the first direction.

7. The rechargeable battery pack according to claim 6, wherein
the power electronics part is designed to transform and/or to switch the electrical drive power.

8. The rechargeable battery pack according to claim 7, wherein
the power electronics part comprises at least one circuit breaker.

9. The rechargeable battery pack according to claim 1, wherein at least one of:
the measurement electronics part extends by way of a first measurement electronics part end up to the first cell block end,
the measurement electronics part extends by way of a second measurement electronics part end up to at most a half of a path from the first cell block end in the first direction to the second cell block end,
the power electronics part extends by way of a first power electronics part end up to the second cell block end, and
the power electronics part extends by way of a second power electronics part end up to at most a half of a path from the second cell block end counter to the first direction to the first cell block end.

10. The rechargeable battery pack according to claim 1, wherein
the electronics unit has a printed circuit board,
the printed circuit board carries the measurement electronics part and/or a power electronics part, and
the printed circuit board is physically arranged with a printed circuit board plane parallel to the first cell block side and/or orthogonal to the second direction.

11. The rechargeable battery pack according to claim 6, wherein
the electronics unit has a common printed circuit board, and
the common printed circuit board carries the measurement electronics part and the power electronic part.

12. The rechargeable battery pack according to claim 1, wherein
the rechargeable battery cells are elongate, round cells,
the round cells are each physically arranged with a round cell longitudinal axis not in parallel to one or both of the first direction and the second direction.

13. The rechargeable battery pack according to claim 12, wherein
the round cells are each physically arranged with the round cell longitudinal axis in a third direction not parallel to the first and second directions.

14. The rechargeable battery pack according to claim 1, wherein
at least some of the rechargeable battery cells are physically arranged consecutively in the second direction and are electrically connected in parallel.

15. The rechargeable battery pack according to claim 1, wherein
the cell block is cuboidal.

16. The rechargeable battery pack according to claim 1, further comprising:
at least one further cell block, wherein the at least one further cell block is physically arranged on the second cell block side in the second direction, wherein at least one of:
(i) one of the rechargeable battery cells of the at least one further cell block at a first cell block end of the at least one further cell block is at earth potential, and one of the rechargeable battery cells of the at least one further cell block at a second cell block end of the at least one further cell block is at a maximum potential, and
(ii) the rechargeable battery pack has at least one further first electrical power line and at least one further second electrical power line, wherein the at least one further second electrical power line is electrically connected to one of the rechargeable battery cells of the at least one further cell block at the second cell block end, and wherein the at least one further first electrical power line at the second cell block end of the cell block runs from the first cell block side of the cell block in the second direction at least to the second cell block side of the cell block and, on a second cell block side of the at least one further cell block, counter to the first direction to the first cell block end of the at least one further cell block and is electrically connected to one of the rechargeable battery cells of the at least one further cell block at the first cell block end.

17. The rechargeable battery pack according to claim 1, wherein at least one of:
(i) a maximum electrical drive power is a minimum of 50 W and/or a maximum of 5 kW,
(ii) the maximum potential is a minimum of 10 V and/or a maximum of 500 V, and
(iii) a maximum energy content is a minimum of 80 Wh and/or a maximum of 5 kWh.

18. A gardening and/or forestry work system comprising:
a rechargeable battery pack according to claim 1;
an electrically driven gardening and/or forestry work appliance,
wherein the rechargeable battery pack and the electrically driven gardening and/or forestry work appliance are designed for electrical connection to one another for supplying electrical drive power from the rechargeable battery pack to the electrically driven gardening and/or forestry work appliance.

19. The gardening and/or forestry work system according to claim 18, further comprising:
a harness, wherein the harness is designed to carry the rechargeable battery pack.

20. The gardening and/or forestry work system according to claim 18, wherein
the electrically driven gardening and/or forestry work appliance is a saw, a pole-mounted pruner, a brush cutter, a hedge trimmer, a hedge cutter, a blower, a leaf blower, a lopper, an angle grinder, a sweeping appliance, a sweeping roller, a sweeping brush, a lawnmower, a scarifier or a grass trimmer.

* * * * *